US005932350A

United States Patent [19]

Lauer et al.

[11] Patent Number: 5,932,350

[45] Date of Patent: Aug. 3, 1999

[54] COATING SUBSTRATES

[75] Inventors: Rosemarie Palmer Lauer, Chalfont; Matthew Stewart Gebhard, New Britain; Anne Seton Demasi, Philadelphia, all of Pa.

[73] Assignee: Rohm and Haas Company, Philadelphia, Pa.

[21] Appl. No.: 08/985,665

[22] Filed: Dec. 5, 1997

Related U.S. Application Data

[60] Provisional application No. 60/033,481, Dec. 19, 1996.

[51] Int. Cl.[6] .......... B32B 9/04

[52] U.S. Cl. .......... 428/411.1

[58] Field of Search .......... 428/411.1

[56] References Cited

U.S. PATENT DOCUMENTS

| | | | |
|---|---|---|---|
| 4,070,258 | 1/1978 | McGinniss | 524/901 |
| 4,099,973 | 7/1978 | Miura | 96/115 |
| 4,291,087 | 9/1981 | Warburton | 428/288 |
| 4,781,987 | 11/1988 | Bolgiano | 428/424.6 |
| 5,213,901 | 5/1993 | Ingle . | |
| 5,227,423 | 7/1993 | Ingle . | |
| 5,278,225 | 1/1994 | Kohlhammer et al. . | |
| 5,527,835 | 6/1996 | Shustack | 522/42 |
| 5,548,005 | 8/1996 | Kurth | 522/84 |
| 5,691,006 | 11/1997 | Salvin | 427/510 |

FOREIGN PATENT DOCUMENTS

| | | |
|---|---|---|
| 0697417 | 2/1996 | European Pat. Off. . |
| 4344391 | 6/1995 | Germany . |
| 7-102218 | 4/1995 | Japan . |

OTHER PUBLICATIONS

Radiation Curing in Polymer Science and Technology, vol. 1 Fundamentals and Methods, edited by J.P. Fouassier and J.F. Rabek (1993) pp. 1–47.

*Primary Examiner*—Paul R. Michl

[57] ABSTRACT

In a method for coating a substrate, preferably a cellulosic substrate, an aqueous coating comprising a polymer having carbonyl functional moities may be tandem coated directly onto or beneath an UV cured coating. The method provides a low VOC system which offers good adhesion between the two coatings.

11 Claims, No Drawings

COATING SUBSTRATES

This application claims the benefit of U.S. Provisional Application Ser. No. 60/033,481, filed Dec. 19, 1996.

This invention concerns a method for tandem coating substrates with both highly crosslinked thermoset coatings and aqueous based coatings. In particular, though not exclusively, the invention concerns a method for tandem coating cellulosic substrates with both high solids UV curable coatings and waterborne paints.

Cellulosic substrates, particularly composite cellulosic substrates such as MDF, hardboard and particle board, are extensively used in the manufacture of interior furniture and other board applications. Often, to prevent water penetration into the substrate which otherwise might cause damage to the substrate by fiber swelling due to hydration, the substrate is coated with a low VOC, high solids UV curable coating which, once cured, seals the substrate and provides an effective barrier against water ingress.

Unfortunately, high solids UV curable coatings tend to be more suited to clear, rather than pigmented, applications. Accordingly, when required for decorative purposes, substrates sealed with clear UV cured coatings would normally be subsequently painted with a pigmented, organic solvent based topcoat.

With increasing environmental and governmental regulatory pressure, there is a strong desire to reduce or eliminate volatile organics in paints. However, currently, in many coatings markets, organic solvent borne paints still dominate because alternative water-based, low VOC paints fail to meet the performance criteria required of them. In particular, in the case of cellulosic substrates, though the combination of a high solids UV curable sealer in conjunction with a waterborne, pigmented topcoat would appear to offer a route to low VOC, low energy coatings with attractive economics, because of the severe adhesion problems typically encountered between waterborne topcoats and highly crosslinked undercoats, the successful implementation of this system has not been realised.

A number of prior art documents disclose waterborne compositions for coating various substrates. For example: JP-A-7102218 (Nippon Carbide Industries KK) discloses an aqueous coating composition comprising a core/shell polymer, having acetoacetyl groups in the shell polymer, hydrazine derivatives with residual hydrazine groups and/or amines with two or more amine groups, and pigments. The composition is described to be suitable for coating many substrates including metal substrates, plastics substrates, wood, leather and inorganic substrates such as concrete or mortar, and over old films such as on vinyl chloride, alkyd resins and other old paint films. The plastics substrates disclosed are ABS sheet, polystyrene sheet and vinyl chloride covered steel sheets, which plastics are generally known to be thermoplastics materials DE-A-4344391 (Rohm GmbH) discloses aqueous dispersions of film-forming polymers based on polymethyl(meth)acrylate esters for coating surfaces of thermoplastic parts. The film-forming polymer may be polymerised from a monomer system comprising up to 15% crosslinkable monomer with an acetoacetyl group, such as acetoacetoxyethylmethacrylate (AAEM).

U.S. Pat. No. 5,213,901 and U.S. Pat. No. 5,227,423 (Rohm and Haas Company) disclose an aqueous binder composition comprising a copolymer formed from a monomer system including 10 to 35% by weight of a wet adhesion promoting monomer selected from the group consisting of ethyleneureido-, cyanoacetoxy- and acetoacetoxy-containing monomers and hydroxymethyldiacetoneacrylamide. The binder is disclosed for use in a paint.

U.S. Pat. No. 5,278,225 (Wacker-Chemie GmbH) discloses aqueous dispersions of copolymers comprising acetoacetoxy functional groups and aminooxy crosslinking agents useful as binders for producing coverings, coatings and impregnations in the coating field. It is disclosed that the dispersions are particularly suitable as adhesives for bonding to corona- and flame- pretreated polyolefin surfaces.

EP-A-0697417 (Rohm and Haas Company) discloses a latex binder for producing a high gloss coating on a weathered substrate, which substrate may be a chalky, wood or cement substrate. The binder is disclosed to comprise a latex polymer bearing an acid functional pendant moiety and an enamine functional pendant moiety resulting from the reaction of acetoacetyl functional pendant moity on the latex polymer with ammonia or amine.

Whilst the prior art documents generally teach the use of aqueous coatings on various substrates, none of these documents disclose or suggest that the aqueous coatings may be successfully applied to highly crosslinked polymeric surfaces, such as are formed when a substrate is coated with a thermoset material, and thereby replace the solvent-borne coatings which are so commonly used for this very specific application. Where references to coating polymeric surfaces have been made in the above prior art documents, the polymeric surfaces have been thermoplastic materials, which materials are generally understood to be not highly crosslinked materials.

It is an object of the present invention to provide a low VOC system for tandem coating substrates with both a highly crosslinked coating and a waterbased coating.

In accordance with the present invention there is provided a method comprising tandem coating a substrate with (i) a highly crosslinked coating formed from a UV curable composition, and (ii) a cured coating formed from an aqueous composition comprising a polymer comprising, as polymerised units, 0.1 to 100%, preferably 1 to 50% and even more preferably 5 to 20%, by weight of the polymer of at least one monomer capable of producing carbonyl functional moities in the polymer. The substrate may be coated first with the highly crosslinked coating (i) followed by the cured coating (ii), or the substrate may be coated first with the cured coating (ii) followed by the highly crosslinked coating (i). The method of the present invention provides a low VOC system for tandem coating substrates with both a highly crosslinked coating and a waterbased coating.

The highly crosslinked coating (i) is preferably formed from a thermoset material. Such material may be a UV curable composition, which before cure may be a high solids composition or a waterborne composition comprising appropriate UV curable components. UV curable coatings can be generally divided into two main categories: 1) free radical polymerised (meth)acrylate functionalised polymers and 2) cationically polymerised epoxies. Methacrylate and acrylate functionalised polymers generally comprise (meth)acrylate-functional oligomers and monomers combined with a photoinitiator to facilitate UV cure. These (meth)acrylate-functional oligomers are typically prepared by a) reaction of difunctional epoxies with methacrylic or acrylic acid, b) the condensation product of difunctional isocyanates with hydroxy-functional (meth)acrylates, or c) the condensation product of (meth)acrylic acid and hydroxyl groups on a polyester backbone, or an hydroxy acrylate with residual acid groups on a polyester backbone. Cationic systems are based on cycloaliphatic epoxies and a photoinitiator which decomposes to give a "super" acid with UV radiation. The super acid catalyses the cationic polymerisation of the epoxy. (See Radiation Curing In Polymer Science And Technology, Vol 1: Fundamentals in Methods, Edited by J. P. Fouassier and J. E. Rabek, published by Elsevier Applied Science (1993). The UV curable coatings after exposure to UV radiation produce highly crosslinked coatings which have traditionally proved difficult to adhere waterbased topcoats onto without the use of an intermediate coating. Preferably, the coating (i) is cured in the presence of oxygen, more preferably in the presence of air.

The cured coating (ii) is formed from an aqueous composition comprising a carbonyl functional polymer preferably comprising polymerised units of one or more monomers selected from the group consisting of ethyleneureido-containing monomers, cyanoacetoxy-containing monomers, acetoacetoxy-containing monomers, acrolein, methacrolein, vinyl ($C_1$–$C_{20}$)alkyl ketones and keto-containing amides such as diacetone acrylamide. The ethyleneureido-containing monomers, cyanoacetoxy-containing monomers, and acetoacetoxy-containing monomers are described in detail in U.S. Pat. No. 5,213,901 on column 3, line 48, to column 4, line 38.

In a particularly preferred embodiment, the aqueous composition comprises a polymer comprising from 0.1 to 100%, more preferably 1 to 50%, and most preferably 5 to 20% by weight polymerised units of one or more acetoacetyl functional monomers having the structure:

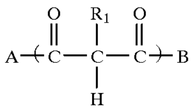

wherein $R_1$ is either H, alkyl having 1 to 10 carbon atoms or phenyl;

A is either:

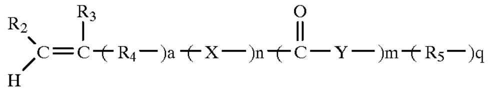

or

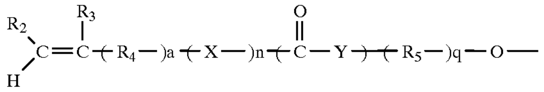

wherein $R_2$ is either H, alkyl having 1 to 10 carbon atoms or phenyl, substituted phenyl, halo, $CO_2CH_3$, or CN, $R_3$ is either H, alkyl having 1 to 10 carbon atoms or phenyl, substituted phenyl or halo, $R_4$ is either alkylene or substituted alkylene having 1 to 10 carbon atoms or phenylene, or substituted phenylene, $R_5$ is either alkylene or substituted alkylene having 1 to 10 carbon atoms;

a, m, n and q are independently either 0 or 1,

X and Y are independently either —NH— or —O—;

B is either A, alkyl having 1 to 10 carbon atoms or phenyl, substituted phenyl, or heterocyclic, preferably a (C4 to C10) heterocyclic.

Particularly preferred monomers are acetoacetoxyethylmethacrylate (AAEM), acetoacetoxyethylacrylate (AAEA), acetoacetoxypropylmethacrylate, allylacetoacetate, acetacetoxybutylmethacrylate, 2,3-di (acetoacetoxy)propyl methacrylate, vinyl acetoacetate, or combinations thereof.

Optionally, the polymer used in coating (ii) is a copolymer comprising carbonyl functionality wherein the copolymer comprises, as polymerised units, from 0 to 99.9%, preferably 50 to 99%, more preferably 80 to 95%, by weight of one or more copolymerisable monomers. Preferably, the copolymerisable monomers are selected from the group consisting of substituted and unsubstituted, saturated and monoethylenically unsaturated carboxylic acid ester monomers, such as methyl(meth)acrylate, ethyl(meth)acrylate, butyl (meth)acrylate, 2-ethylhexyl(meth)acrylate, decyl(meth) acrylate, lauryl(meth)acrylate, isodecyl(meth)acrylate, oleyl (meth)acrylate, palmityl(meth)acrylate, stearyl(meth) acrylate, methyl itaconate, methylfumarate, butyl fumarate, glycidyl methacrylate, dicyclopentadienyl(meth)acrylate, isocyanatoethylmethacrylate hydroxyethyl(meth)acrylate, hydroxypropyl(meth)acrylate, N,N'-dimethylamino(meth) acrylate and vinyl acetate; subsituted and unsubstituted carboxylic acid monomers and anhydrides thereof, such as (meth)acrylic acid, crotonic acid, itaconic acid, fumaric acid, maleic acid and maleic anhydide; substituted and unsubstituted (meth)acrylamide monomers; styrene and substituted styrene monomers; other substituted or unsubstituted vinyl monomers such as vinyl chloride, vinylidene chloride and N-vinylpyrrolidone; other substituted and unsubstituted alkylene monomers such as ethylene, propylene, butylene, and isopropylene; and acrylonitrile and methacrylonitrile.

If desired, the polymer used in coating (ii) may also comprise, as polymerised units, 0.1 to 25% by weight substituted and unsubstituted polyfunctional ethylenically unsaturated monomers such as allylmethacrylate, diallylphthalate, 1,4-butyleneglycol di(meth)acrylate, 1,6-hexanediol diacrylate and divinylbenzene. Such monomers tend to induce premature crosslinking or gelling of the copolymer.

The copolymer used in coating (ii) is preferably a thermoplastic or substantially uncrosslinked copolymer when it is applied (in its uncured state) to the substrate.

The polymer used in coating (ii) may comprise acid functional pendant moiety sufficient to provide the polymer with an acid number of from 1 to 325, preferably from 3 to 130. The desired acid number is achieved by controlling the amount of acid functional monomer utilized in the polymer by a known method.

The polymer used in coating (ii) preferably has a glass transition temperature of from −40° C. to 120° C., as measured by differential scanning calorimetry. The Tg is is reported at the mid-point of the inflection using the half-height method. A polymer having a Tg of from 0° C. to 90° C. is most preferred. Preferably, the polymer has a GPC weight average molecular weight of 500 to 5,000,000. The GPC weight average molecular weight can be adjusted through the appropriate use of methods known in the art such as by the use of chain transfer agents. "GPC" weight average molecular weight means the average molecular weight as determined by gel permeation chromatography as described on page 4 of The Characterization of Polymers published by Rohm and Haas Company in 1976, utilizing polymethymethacrylate as the standard. The average particle size on the diameter of the polymer particles suitable for use in the coating (ii) is preferably from 20 to 1000 nm, more preferably 30 to 500 nm.

The aqueous composition in coating (ii) may comprise at least two mutually incompatible copolymers, at least one of which is the polymer having carbonyl functional moities described above. These mutually incompatible copolymers may be present in the following morphological configurations, for example, core/shell particles with complete shell phases surrounding a single core, core/shell particles with shell phases incompletely encapsulating the core, core/shell particles with a multiplicity of cores, interpenetrating network particles, and multilobal particles described in the commonly assigned U.S. Pat. No. 4,791,151. In all these cases, the majority of the surface area of the particle will be occupied by at least one outer phase and the interior of the particle will be occupied by at least one inner phase. The mutual incompatibility of the two polymer compositions may be determined in various ways known in the art. The use of scanning electron microscopy using staining techniques to emphasise the difference between the appearance of the phases, for example, is such a technique.

In a further embodiment of the invention, the polymer used in coating (ii) may be blended with other polymers, such as those polymers normally found in paints and other coatings. For example, the copolymer (ii) may be blended with a polyurethane, a polyester, a polyamide, an acrylic copolymer, a styrene-acrylic copolymer or another polymer, or mixtures of two or more of such polymers.

The polymerisation techniques which may be used to prepare the polymer are well known in the art. The polymer may be prepared by aqueous, solution or emulsion polymerisation, with emulsion polymerisation being preferred. The polymerisation may be a redox or thermal initiation process employing conventional free radical initiators, such as, for example, ammonium and alkyl sulphates, hydrogen peroxide, benzoyl peroxide or t-butyl peroctoate at levels typically of from 0.05 to 3% by weight based on the total weight of monomer. Redox systems using the same initiators coupled with suitable reducing agents such as for example isoascorbic acid, sodium bisulphite or sodium sulphoxylate formaldehyde may be used a similar levels.

The polymer preferably comprises from 1 to 100% of the total solids in coating (ii). Typically, the coating (ii) will preferably comprise 80 to 30% water.

The coating (ii) may comprise additional ingredients, such as thickeners, surfactants, pigments, flatting aids, waxes, slip aids, coalescents and/or plasticisors, such materials being typical ingredients of waterbased paints and coatings. The coating may also include a post crosslinking agent such as polyaziridine, polyisocyanate, polycarbodiimide, polyepoxide, polyaminoplast, polyalkoxysilane, polyoxazolidine, polyamine and polyvalent metal compounds, to improve the cure time of the waterbased coating once it has been applied to the substrate.

Preferably, the substrate is a cellulosic material, such as wood or paper or a composite material thereof, such as MDF, hardboard, particle board or cardboard. In a particularly preferred embodiment, the cellulosic mateial is selected from the group consisting of wood, MDF, hardboard and particle board. Such materials typically find application in the manufacture of interior furniture and home fittings. In this embodiment, preferably the cellulosic substrate is first coated with the highly crosslinked coating (i), which may act as a sealer or undercoat to prevent the ingress of water into the fibers of the substrate, and then the substrate, with the highly crosslinked coating, is further coated with the waterbased coating (ii). The waterbased coating may be a paint, including a pigment and other components typically found in such formulations, to give, once cured, the appropriate decorative effect to the substrate. In another embodiment, the cellulosic substrate is a paper material such as may be typically used in a printing or packaging application. Here, the waterbased coating (ii) may first be applied to the substrate, such as in the form of an ink, and then the cured waterbased coating (ii) and substrate are both coated with the highly crosslinked coating (ii).

The invention will now be further described with reference to the following examples:

EXAMPLES

Various emulsion polymers A to I as detailed in Table I were prepared by the following procedure:

Procedure for Preparation of Polymer A

A 4-neck, 5-liter round bottom reaction flask containing an Initial Kettle Charge of 850 g DI water and 35.5 g lauryl $(EO)_4$ Na sulfate (30%) was heated to 85° C. under a nitrogen sweep. At 85° C., an aliquot of a Monomer Emulsion (ME) comprising 750 g DI water, 38.8 g lauryl $(EO)_4$ Na sulfate (30%), 538 g butyl acrylate (BA), 697.9 g methyl methacrylate (MMA), 145.4 g acetoacetoxy ethyl methacrylate (AAEM), and 72.7 g methacrylic acid (MAA) was charged to the reaction vessel. The nitrogen sweep was discontinued. A catalyst solution consisting of 3.7 g sodium persulfate (NaPS) was added at a batch temperature of 84° C. and the batch exothermed to 88° C. After the peak exotherm, the batch was held for an additional 5 minutes. Then a solution consisting of 3.6 g sodium carbonate ($Na_2CO_3$) dissolved in 55 g DI water was charged to the batch.

The remaining monomer emulsion along with a cofeed consisting of 1.8 g NaPS dissolved in 90 g DI water was then fed to the kettle over 90 minutes. The reaction temperature was held at 85+/−2° C. throughout the feed period. On completion of the monomer emulsion, the monomer emulsion vessel was rinsed with 45 g DI water which was fed to the kettle. When all feeds were completed, the batch was held for 15 minutes at temperature. Thirty (30) g of DI water was added to the batch before cooling. At 60–65° C., a redox initiator was added (0.05 parts t-butyl hydroperoxide and 0.034 parts isoascorbic acid/100 parts). A neutralizer solution consisting of 67 g of 29% ammonia in 200 g DI water was added. The viscosity was adjusted with 96 g DI water.

Procedure for Preparation of Polymers B to I

The process described for Polymer A was used to prepare all additional examples. The exact monomer and kettle charges are described in Table I The raw materials used in Table I are defined as follows:

| | |
|---|---|
| BA | Butyl Acrylate |
| MMA | Methyl Methacrylate |
| AAEM | Acetoacetoxy ethyl methacrylate |
| DAAM | Diacetone Acrylamide |
| MEEU | Methacryloxyethylethyleneurea |
| MAA | Methacrylic Acid |
| n-DDM | n-Dodecyl Mercaptan |
| Surfactant A | Ammonium nonoxynol-4 sulfate |
| Surfactant B | Sodium laureth sulfate |

TABLE I

| Polymer | A | B | C | D | E | F | G | H | I Comparative |
|---|---|---|---|---|---|---|---|---|---|
| Kettle Charge | | | | | | | | | |
| DI Water | 850 | 850 | 850 | 850 | 850 | 850 | 850 | 1250 | 850 |
| Surfactant A (58%) | — | — | 18.3 | 18.3 | 18.3 | 18.3 | 18.3 | 18.3 | 18.3 |
| Surfactant B (30%) | 35.5 | 35.5 | — | — | — | — | — | — | — |
| Kettle Catalyst Solution | | | | | | | | | |
| Sodium Persulfate | 3.7 | 3.7 | 3.7 | 3.7 | 3.7 | 3.7 | 3.7 | 3.7 | 3.7 |
| DI Water | 20 | 20 | 20 | 20 | 20 | 20 | 20 | 20 | 20 |
| Kettle Buffer Solution | | | | | | | | | |
| Sodium Carbonate | 3.6 | 3.6 | 3.6 | 3.6 | 3.6 | 3.6 | 3.6 | 3.6 | 3.6 |
| DI Water | 55 | 55 | 55 | 55 | 55 | 55 | 55 | 55 | 55 |
| Monomer Emulsion | | | | | | | | | |
| DI Water | 750 | 750 | 750 | 750 | 750 | 750 | 750 | 677.3 | 750 |
| Surfactant A (58%) | — | — | 20.1 | 20.1 | 20.1 | 20.1 | 20.1 | 20.1 | 20.1 |
| Surfactant B (30%) | 38.8 | 38.8 | — | — | — | — | — | — | — |
| BA | 538.0 | 538.0 | 538 | 538 | 538 | 538 | 538 | 530.8 | 538 |
| MMA | 697.9 | 552.5 | 807 | 770.6 | 828.8 | 836 | 552.5 | 777.9 | 843.3 |
| AAEM | 145.4 | 290.8 | 36.4 | 72.7 | 14.54 | 7.3 | — | — | — |
| DAAM | — | — | — | — | — | — | 290.8 | — | — |
| MEEU (50% in H2O) | — | — | — | | — | — | — | 145.4 | — |
| MAA | 72.7 | 72.7 | 72.7 | 72.7 | 72.7 | 72.7 | 72.7 | 72.7 | 72.7 |
| n-DDM | — | — | — | — | — | 14.6 | — | 14.5 | — |
| Cofeed Catalyst Solution | | | | | | | | | |
| Sodium Persulfate | 1.8 | 1.8 | 1.8 | 1.8 | 1.8 | 1.8 | 1.8 | 1.8 | 1.8 |
| DI Water | 90 | 90 | 90 | 90 | 90 | 90 | 90 | 90 | 90 |
| Neutralizer | | | | | | | | | |
| 29% Ammonia | 67.0 | 96.8 | 44.6 | 52.1 | 40.2 | 38.6 | 112.7 | 9.3 | 247 |
| DI Water | 200 | 170 | 200 | 200 | 200 | 200 | 200 | — | 37.1 |
| In-Process and Final Dilution | 176 | 176 | 234 | 226 | 239 | 263 | 216 | 92.7 | 245 |
| Physical Characteristics | | | | | | | | | |
| % Total Solids | 38.4 | 38.2 | 37.9 | 37.9 | 38.5 | 34.0 | 29.4 | 38.6 | 38.0 |
| pH | 8.6 | 8.5 | 8.7 | 8.7 | 8.7 | 8.7 | 8.5 | 7.1 | 8.7 |
| Particle Size (nm) | 86 | 86 | 92 | 93 | 91 | 97 | 114 | 84 | 85 |
| Visc, cps (Brookfield) @ 3, 60 | 1308 | 1734 | 1724 | 1740 | 1440 | 1702 | 3970 | 21 | 766 |

Examples 1–13

Waterbased coatings comprising one or more of the above emulsion polymers were prepared by adding the listed ingredients while stirring with a conventional lab mixer:

| | |
|---|---|
| Example #1 (Comparative): | Example #2: |
| 100g Polymer I | 100g Polymer A |
| 2.85g Diethyleneglycol monobutyl ether | 2.88g Diethyleneglycol monobutyl ether |
| 8.55g Ethyleneglycol monobutyl ether | 8.62g Ethyleneglycol monobutyl ether |
| 17.4g water | 21.3g water |
| Example #3: | Example #4: |
| 100g Polymer B | 100g Polymer C |
| 2.88g Diethyleneglycol monobutyl ether | 2.88g Diethyleneglycol monobutyl ether |
| 8.62g Ethyleneglycol monobutyl ether | 8.62g Ethyleneglycol monobutyl ether |
| 24.2g water | 18.8g water |
| Example #5: | Example #6: |
| 100g Polymer D | 100g Polymer E |
| 2.88g Diethyleneglycol monobutyl ether | 2.88g Diethyleneglycol monobutyl ether |
| 8.62g Ethyleneglycol monobutyl ether | 8.62g Ethyleneglycol monobutyl ether |
| 22.4 g water | 17.6g water |
| Example #7 | Example #8 |
| 100g Polymer F | 100g Polymer C |
| 2.55g Diethyleneglycol monobutyl ether | 2.03g Diethyleneglycol monobutyl ether |
| 7.64g Ethyleneglycol monobutyl ether | 6.07g Ethyleneglycol monobutyl ether |
| 16.4g water | 15.2g water |

-continued

| | |
|---|---|
| Example #9: | 1.55g Acrysol ™ RM-8W |
| 100g Polymer H | Example #10: |
| 2.55g Diethyleneglycol monobutyl ether | 10g Example 1 |
| 7.64g Ethyleneglycol monobutyl ether | 10.2g Example 3 |
| 10.1g water | Example #12: |
| Example #11: | 25g Example #1 |
| 10g Example 1 | 8.8g Pigment Grind A |
| 5.1g Example 3 | Pigment Grind A: |
| Example #13: | 855.4g water |
| 25g Example #3 | 140.4g Tamol ™ 731 |
| 8.5g Pigment Grind A | 23.8g Triton ™ CF-10 |
| | 11.8g Tego ™ Foamex 800 |
| | 2688g Ti-Pure ™ R-700 |

Diethyleneglycol monobutyl ether is supplied by Union Carbide, Chemicals and Plastics Company Inc., 39 Old Ridgebury Rd., Danbury Conn. 06817-0001

Ethyleneglycol monobutyl ether is supplied by Union Carbide, Chemicals and Plastics Company Inc., 39 Old Ridgebury Rd., Danbury Conn. 06817-0001

Acrysol™ RM-8W is supplied by Rohm and Haas Company, Independence Mall West, Philadelphia Pa. 19105

Tamol™ 731 is supplied by Rohm and Haas Company, Independence Mall West, Philadelphia Pa. 19105

Triton™ CF-10 is supplied by Union Carbide, Indutrial Chemicals Division, 39 Old Ridgebury Rd., Danbury Conn. 06817-0001

Tego™ Foamex 800 is supplied by Goldschmidt Chemical Corp. P.O. Box 1299, 914 Randolph Rd., Hopewell, Va. 23860

Ti-Pure™ R-700 is supplied by Dupont Company, Chemicals and Pigments Division, Wilmington, Del. 19898.

Preparation of Substrates

Five different UV curable materials were used to coat the substrate and they are listed below along with the supplier. A #12 wire wound rod was used to apply a 37.5 mm (microns) wet film thickness over a Masonite type hardboard substrate. The first coat was allowed to dry 10 minutes then irradiated with 2 UV lamps @ 200 watts/2.5 cm using a UV processor from AETEK, Van Dyke Rd Plainfield Ill. 60544. The UV line speed was 12 m per minute. The coating was then sanded with 240 grit sand paper. A second coat was applied as above and allowed to dry 10 minutes then irradiated with 2 UV lamps @ 200 watts/2.5 cm at a line speed of 12 m per minute.

Coating #1: CDG #UV-102 is supplied by the Coating Development Group, P.O. Box 14817, Philadelphia Pa. 19134

Coating #2: CDG #WM0010 is supplied by the Coating Development Group, P.O. Box 14817, Philadelphia Pa. 19134

Coating#3: UV sealer/filler #107R000 is supplied by Forest Paint Company, 1011 McKinley Ave, Eugene Oreg. 97402

Coating#4: Magic Light Clear Sealer #107R014—is supplied by Forest Paint Company, 1011 McKinley Ave, Eugene Oreg. 97402

Coating#5: Off White UV Primer #99-4647-07—is supplied by Forest Paint Company, 1011 McKinley Ave, Eugene Oreg. 97402

Coating #1 is described by the supplier as a urethane acrylic. Coating #2 is described by the supplier as a cationic UV sealer. Coating #3 is described by the supplier as a polyester UV filler. Coating #4 is described by the supplier as a polyester/epoxy UV filler. Coating #5 is described by the supplier as an epoxy UV primer.

The UV coated Masonite substrates were then coated with the waterbased formulation #1–#13. Examples #1–#13 were each drawn down at a 175 mm (microns) wet film over the coated boards which were prepared as described above. The wet coatings were allowed to dry for 30 minutes at 250° C. The boards were then placed in an oven at 50° C. for 30 minutes. After waiting at least 24 hours the adhesion was rated using a Gardner cross hatch adhesion tester (PA-2054 blade) and following ASTM test method D-3359. The coating was scored with the adhesion tester, and Scotch™ Magic™ Tape (#810) was applied to the scored area. The tape was removed as given by ASTM test method D-3359. The adhesion rating for each of the examples over the UV coated and cured boards is given in Table II.

TABLE II

| UV Coat | Ex. #1 | Ex. #2 | Ex. #3 | Ex. #4 | Ex. #5 | Ex. #6 | Ex. #7 | Ex. #8 | Ex. #9 | Ex. #10 | Ex. #11 | Ex. #12 | Ex. #13 |
|---|---|---|---|---|---|---|---|---|---|---|---|---|---|
| #1 | 1 | 5 | 5 | 5 | 5 | — | 5 | 5 | 5 | 5 | 5 | — | — |
| #2 | 0 | 5 | 5 | 5 | 5 | 3 | — | — | — | — | — | — | — |
| #3 | 0 | 5 | 5 | 5 | 5 | — | — | — | — | — | — | — | — |
| #4 | 0 | 5 | 5 | 5 | 5 | — | — | — | — | — | — | 2 | 5 |
| #5 | 0 | 5 | 5 | 3 | 5 | 4 | — | — | — | — | — | — | — |

0 indicates complete removal of the coating; 5 indicates no coating was removed; 2, 3, and 4 all represent an intermediate level of adhesion The results clearly show that Examples 2–11, and Example 13 which are in accordance with the invention all display improved adhesion relative to the two comparative examples, Example #1 and Example #12, which do not contain the invention.

The above results are not predictable from the prior art. As will be demonstrated below, coatings which may adhere well and so be suitable for coating one particular thermoplastic substrate may not adhere well to another thermoplastic substrate. It is therefore not possible to predict that a composition which adheres well to and so is suitable for coating a low crosslinked thermoplastic material would adhere well to and so be suitable for coating a highly crosslinked thermoset material such as a UV coating. The examples below also indicate the contrary, that a composition which adheres well to a highly crosslinked thermoset substrate may not adhere well to a thermoplastic substrate.

Examples 1, 3, 8, and 9 above were drawn down over the following thermoplastic materials:

1) Plexiglas™—a polymethyl methacrylate supplied by Atohaas North America, 100 Independence Mall West, Philadelphia Pa.
2) GE Noryl™ PX844—a blend polymer of high impact polystyrene and polyphenylene oxide supplied by Standard Plaque Inc. 17271 Francis St. Melvindale, Mich. 48122.
3) GE Lexan™ ML4291-7502—a polycarbonate supplied by Standard Plaque Inc. 17271 Francis St. Melvindale, Mich. 48122
4) GE Cycolac AR-3501—an ABS plastic supplied by Standard Plaque Inc. 17271 Francis St. Melvindale, Mich. 48122

Examples #1, 3, 8, and 9 above were each drawn down at a 175 mm (microns) wet film thickness over all four plastic materials. The wet coatings were allowed to dry for 30 minutes at 25° C. The boards were then placed in an oven at 50° C. for 30 minutes. After waiting at least 24 hours the adhesion was rated using a Gardner cross hatch adhesion tester (PA-2054 blade) and following ASTM test method D-3359. The coating was scored with the adhesion tester, and Scotch™ Magic™ Tape (#810) was applied to the scored area. The tape was removed as given by ASTM test method D-3359. The adhesion rating for the examples over the plastic is given in Table III.

TABLE III

| Plastic | Ex. #1 | Ex. #3 | Ex. #8 | Ex. #9 |
|---|---|---|---|---|
| #1 | 5 | 5 | 5 | 5 |
| #2 | 0 | 0 | 0 | 5 |
| #3 | 5 | 5 | 5 | 5 |
| #4 | 5 | 5 | 5 | 5 |

The results clearly show that even a non-carbonyl functional polymer displays adhesion to the following thermoplastic plastics: polymethyl methacrylate, polycarbonate, and ABS, and so the carbonyl functional containing polymers required in invention are not needed to obtain adhesion. When compared to the data for UV-cured materials, this data underscores the fact that adhesion is not predictable and is much more difficult to obtain to highly crosslinked thermoset materials such as UV-cured coatings. In contrast only one of the examples containing carbonyl functional polymer displays adhesion to the high impact polystyrene/polyphylene oxide blended thermoplastic. In essence what is found is that carbonyl functional polymers are not required to get adhesion to thermoplastics such as PMMA, PC, and ABS, and that carbonyl functional polymers do not appear to provide adhesion to PPO/HIPS thermplastics. The highly crosslinked UV-cured materials employed in the present invention are a unique class of materials which offer a unique set of problems not seen for standard thermoplastics.

We claim:

1. A method comprising tandem coating a substrate by (i) forming a highly crosslinked thermoset coating from a UV curable composition, and (ii) forming a cured coating from an aqueous composition comprising a polymer comprising, as polymerised units, 0.1 to 100% by weight of the polymer of at least one monomer selected from the group consisting of ethyleneurido-containing monomers, cyanoacetoxy-containing monomers, acetoacetoxy-containing monomers acrolein, methacrolein vinyl ($C_1$–$C_{20}$ alkyl ketones and keto-containing amides.

2. A method as claimed in claim 1, wherein the substrate is coated first with the highly crosslinked coating (i) followed by the cured coating (ii).

3. A method as claimed in claim 1, wherein the substrate is coated first with the cured coating (ii) followed by the highly crosslinked coating (i).

4. A method as claimed in claim 1, wherein the aqueous composition comprises a polymer comprising from 0.1 to 100%, by weight polymerised units of one or more acetoacetyl functional monomers having the structure:

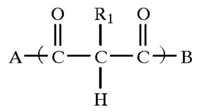

wherein $R_1$ is either H, alkyl having 1 to 10 carbon atoms or phenyl;

A is either:

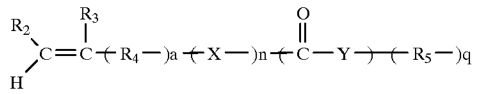

or

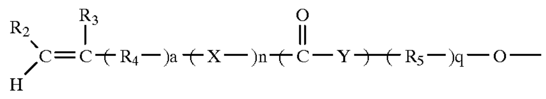

wherein $R_2$ is either H, alkyl having 1 to 10 carbon atoms or phenyl, substituted phenyl, halo, $CO_2CH_3$, or CN, $R_3$ is either H, alkyl having 1 to 10 carbon atoms or phenyl, substituted phenyl or halo, $R_4$ is either alkylene or substituted alkylene having 1 to 10 carbon atoms or phenylene, or substituted phenylene, $R_5$ is either alkylene or substituted alkylene having 1 to 10 carbon atoms;

a, m, n and q are independently either 0 or 1,

X and Y are independently either —NH— or —O—;

B is either A, alkyl having 1 to 10 carbon atoms or phenyl, substituted phenyl, or heterocyclic.

5. A method as claimed in claim 4, wherein the monomers are acetoacetoxyethylmethacrylate (AAEM), acetoacetoxyethylacrylate (AAEA), acetoacetoxypropylmathacrylate, allylacetoacetate, acetacetoxybutylmethacrylate, 2,3-di (acetoacetoxy)propyl methacrylate, vinyl acetoacetate, or combinations thereof.

6. A method as claimed in claim 1, wherein the polymer used in coating (ii) is a copolymer comprising carbony functionality wherein the copolymer comprises, as polymerised units, from 0 to 99.9%, by weight of one or more copolymerisable monomers; preferably, the copolymerisable monomers are selected from the group consisting of substituted and unsubstituted, saturated and monoethylenically unsaturated carboxylic acid ester monomers, such as methyl(meth)acrylate, ethyl(meth)acrylate, butyl(meth) acrylate, 2-ethylhexyl(meth)acrylate, decyl(meth)acrylate, lauryl(meth)acrylate, isodecyl(meth)acrylate, oleyl(meth) acrylate, palmityl(meth)acrylate, steryl(meth)acrylate, methyl itaconate, methylfumarate, butyl fumarate, glycidyl methacrylate, dicyclopentadienyl(meth)acrylate, isocyanoatoethylmethacrylate hydroxyethyl(meth)acrylate, hydroxypropyl(meth)acrylate, N,N'-dimethylamino(meth) acrylate and vinyl acetate; subsituted and unsubstituted carboxylic acid monomers and anhydrides thereof, such as (meth)acrylic acid, crotonic acid, itaconic acid, fumaric acid, maleic acid and maleic anhydide; substituted and unsubstituted (meth)acrylamide monomers; styrene and substituted styrene monomers; other substituted or unsubstituted vinyl monomers such as vinyl chloride, vinylidene chloride and N-vinylpyrrolidone; other substituted and unsubstituted alkylene monomers such as ethylene, propylene, butylene, and isopropylene; and acrylonitrile and methacrylonitrile.

7. A method as claimed in claim 1, wherein the polymer used in coating (ii) comprises, as polymerised units, 0.1 to 25% by weight substituted and unsubstituted polyfunctional ethylenically unsaturated monomers such as allylmethacrylate, diallylphthalate, 1,4-butyleneglycol di(meth)acrylate, 1,6-hexanediol diacrylate and divinylbenzene.

8. A method as claimed in claim 1, wherein the polymer used in coating (ii) comprises acid functional pendant moiety sufficient to provide the polymer with an acid number of from 1 to 325.

9. A method as claimed in claim 1, wherein the polymer used in coating (ii) has a glass transition temperature of from −40° C. to 120° C.

10. A method as claimed in claim 1, wherein the polymer used in coating (ii) has a GPC weight average molecular weight of 500 to 5,000,000.

11. A method as claimed in claim 1, wherein the polymer used in coating (ii) has an average particle size from 20 to 1000 mm.

* * * * *

UNITED STATES PATENT AND TRADEMARK OFFICE

CERTIFICATE OF CORRECTION

PATENT NO. : 5,932,350

DATED : August 3, 1999

INVENTOR(S) : Rosemarie Palmer Lauer, et al

It is certified that error appears in the above-identified patent and that said Letters Patent is hereby corrected as shown below:

Column 10, line 43 should read ---- wet coatings were allowed to dry for 30 minutes at 25°C ----.

Signed and Sealed this

Third Day of April, 2001

Attest:

NICHOLAS P. GODICI

*Attesting Officer* *Acting Director of the United States Patent and Trademark Office*